US005309517A

United States Patent [19]

Barclay

[11] Patent Number: 5,309,517

[45] Date of Patent: May 3, 1994

[54] AUDIO MULTIPLEXER

[75] Inventor: Clay Barclay, Elkhart, Ind.

[73] Assignee: Crown International, Inc., Elkhart, Ind.

[21] Appl. No.: 996,498

[22] Filed: Dec. 23, 1992

Related U.S. Application Data

[63] Continuation of Ser. No. 703,029, May 17, 1991, abandoned.

[51] Int. Cl.[5] .............................................. H04B 1/00

[52] U.S. Cl. ..................................... 381/119; 581/17; 581/92; 581/94; 581/95

[56] References Cited

U.S. PATENT DOCUMENTS

| | | | |
|---|---|---|---|
| 3,992,584 | 11/1976 | Dugan | 381/119 |
| 4,316,060 | 2/1982 | Adams et al. | 381/98 |
| 4,357,492 | 11/1982 | Campbell et al. | 381/119 |
| 4,653,102 | 3/1987 | Hansen | 381/92 |
| 4,792,974 | 12/1988 | Chace | 381/17 |
| 4,933,768 | 6/1990 | Ishikawa et al. | 381/17 |
| 4,941,187 | 7/1990 | Slater | 381/86 |

OTHER PUBLICATIONS

Minimix 6 By G. D. Shaw, vol. 11, No. 11, Practical Electronics Nov. 1975 (381-119).

*Primary Examiner*—John K. Peng
*Assistant Examiner*—Nina Tung
*Attorney, Agent, or Firm*—James D. Hall; Thomas J. Dodd; R. Tracy Crump

[57] ABSTRACT

A multiplexer for mixing multiple audio inputs into a plurality of summed audio outputs in which computer-controlled sensors are associated with the amplifier components of the multiplexer for specific monitoring the voice levels and in association with the volume controls maintains the voice levels within selected parameters.

7 Claims, 1 Drawing Sheet

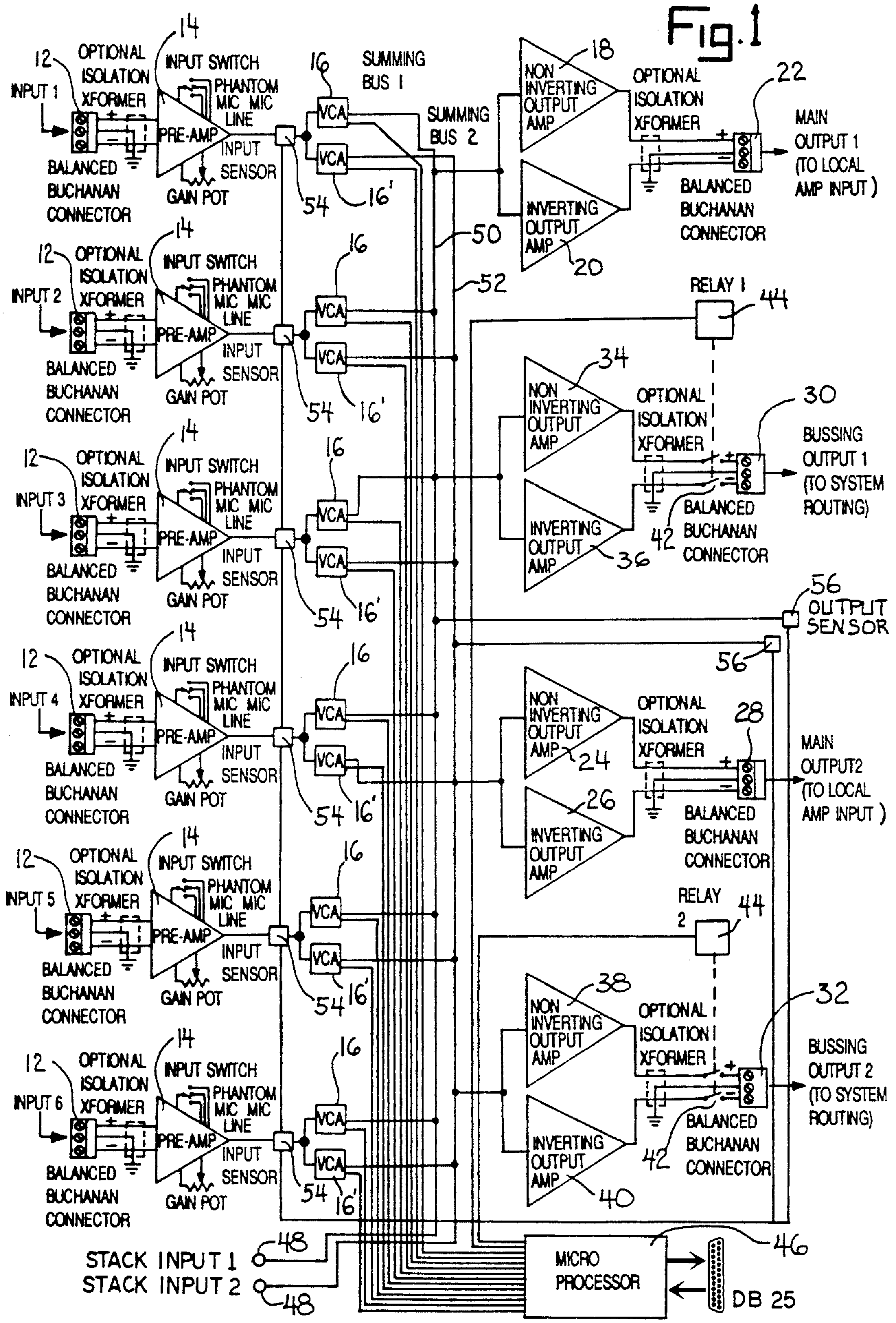
Fig. 1
INPUT 1
INPUT 2
INPUT 3
INPUT 4
INPUT 5
INPUT 6
OPTIONAL ISOLATION XFORMER
BALANCED BUCHANAN CONNECTOR
INPUT SWITCH
PHANTOM MIC MIC LINE
PRE-AMP
INPUT SENSOR
GAIN POT
VCA
SUMMING BUS 1
SUMMING BUS 2
NON INVERTING OUTPUT AMP
INVERTING OUTPUT AMP
MAIN OUTPUT 1 (TO LOCAL AMP INPUT)
RELAY 1
RELAY 2
BUSSING OUTPUT 1 (TO SYSTEM ROUTING)
OUTPUT SENSOR
MAIN OUTPUT2 (TO LOCAL AMP INPUT)
BUSSING OUTPUT 2 (TO SYSTEM ROUTING)
STACK INPUT 1
STACK INPUT 2
MICRO PROCESSOR
DB 25
12
14
16
16'
18
20
22
24
26
28
30
32
34
36
38
40
42
44
46
48
50
52
54
56

AUDIO MULTIPLEXER

This is a continuation of copending application(s) Ser. No. 07/703,029 filed on May 17, 1991, abandoned.

SUMMARY OF THE INVENTION

This invention relates to an audio signal mixer and will have specific application to a multiplexer in which sensors are utilized to detect levels of sound at each input for controlling the audio output of the mixer.

Heretofore, multiplexers have been utilized to route and switch multiple input signals into multiple summed outputs. The volume controls associated with each input may be preset by the mixer user or controlled through a computer interface which, through appropriate software, the signal levels of the various volume controls can be preset for a specific audio layout. For example, the mixer or multiplexer may be connected between a plurality of microphones at a conference table in a large auditorium about which are strategically placed speakers. The speakers may be interconnected to the multiplexer through one or more power amplifiers. The routing and relative sound level from each speaker microphone can be controlled by an operator through the interfaced computer or manual switching system to provide the desired output control for the loudest or the softest of the speakers at the conference table.

In the subject invention, the multiplexer is provided with sensors at the input at each of the voice controls for each of the microphone inputs as well as, preferably, within the summing circuit to monitor the summed sound levels. Through selective programming, the multiplexer microprocessor which is connected between the volume controls and the sensors serves to instantaneously monitor such sound levels to maintain, if desired, or regulate the audio output of the multiplexer from each of the microphone inputs.

Accordingly, it is an object of this invention to provide a multiplexer for mixing a plurality of signal inputs into one or more summed outputs in which the input signals are instantaneously monitored and regulated.

Another object of this invention is to provide a multiplexer for mixing audio input signals into a plurality of output signals in which the input signals are sensed and monitored to instantaneously maintain a predetermined audio output.

Still another object of this invention is to provide a multiplexer having signal sensors at each voice control input for monitoring and regulating the signal output of each voice control.

And a further object of this invention is to provide an audio multiplexer which is for mixing a plurality of audio inputs and which include sensors for monitoring the input and summed output of each voice control.

Other objects of this invention will become apparent upon a reading of the following description.

BRIEF DESCRIPTION OF THE DRAWING

FIG. 1 is a block diagram of the multiplexer of this invention.

DESCRIPTION OF THE PREFERRED EMBODIMENT

The preferred embodiment illustrated is not intended to be exhaustive or to limit the invention to the precise form disclosed. It is chosen and described to best explain the invention and its application and practical use to enable others skilled in the art to use the invention.

Multiplexer 10 is illustrated in the block diagram figure as having six (6) inputs 12. The number of inputs can vary from multiplexer to multiplexer. Each input 12 is adapted for connection to a signal producer such as microphone (not shown). Connected to each input is a pre-amplifier 14 which is used to bring the input signal voltage up to the desired line level voltage. Connected functionally to each pre-amplifier 14 are a pair of voltage control amplifiers 16 and 16' which serve to provide first and second channels by which the volume of the input signal can be varied in db output. For example, each voltage control amplifier may vary it db output between a +25 and −99. Voltage control amplifier 16 associated with one channel of each signal input are summed and connected to output amps, one constituting a non-inverting output amp 18 and the other constituting an inverting output amp 20. The output of amps 18 and 20 are each associated with a connector 22 which is adapted for connection to a power amplifier (not shown) which in turn would be connected to a receiving device such as one or more speakers when the multiplexer is used to receive audio signals. Voltage control amplifiers 16' of the second channel are summed and connected into a pair of output amplifiers, namely non-inverting output amplifier 24 and inverting output amplifier 26. The output of amplifiers 24 and 26 are associated with a connector 28 which is adapted for connection to a power amplifier (not shown) and which in turn is connected to one or more speakers.

Two bussing outputs formed in part by connectors 30 and 32 serve as auxiliary outputs for the summed audio signal. Connector 30 receives the summed signal input from voice control amplifiers 16 through a non-inverting output amp 34 and an inverting output amp 36. Connector 32 receives the summed output signals from voice control amplifiers 16' through non-inverting output amp 38 and inverting output amp 40. The signal outputs through connectors 30 and 32 are controlled by switches 42 each actuated by a separate relay 44.

Forming a part of multiplexer 10 is a microprocessor or computer 46 which is connected between each of the volume control amplifiers 16 and 16' as well as relays 44 controlling the bussing outputs. The signal output through voltage control amplifier 16 and 16' is controlled by microprocessor 46. Stack inputs 48 are provided with connection into the summing bus lines 50 and 52 to allow one or more additional multiplexers to be connected into the system in order to provide additional input connectors 12 for other signal inputs such as from other microphones.

A sensor 54 is connected between each pre-amp 14 and the input of interconnected voltage control amplifier 16 and 16'. Sensors 54 serve to monitor the output signal of each pre-amp 14 into the interconnected voltage control amplifier 16 and 16'. Such sensors may be of the form which senses the voltage level of the output signal from the pre-amps. Sensors 54 are connected to microprocessor 46 with the sensed signal levels at each pre-amp 14 being read by the microprocessor. By providing specific instructions for microprocessor 46 for activation of the voltage control amplifiers 16, 16', each input into multiplexer 10 can be precisely controlled. For example, each microphone connected to input connector 12 can be controlled as to its priority of usage and output level whether it be auto-levelling, compression, or limiting.

Using again the example of the conference table, the microphone of the chairperson would be set high so as to override all other microphones at the conference table if the chairperson speaks. When the chairperson ceases speaking and another speaker at the table chooses to speak, his or her microphone would be automatically enabled with the volume being adjusted to accommodate a soft voice, in which case the volume level would be increased, or a loud voice, in which the volume level would be decreased. Also, a priority of speaking order could be assigned to each microphone at the conference table which would allow for progressive discussion by enabling the speakers only to speak in a selected order or, if once spoken, not to be able to speak again until other speakers have spoken. If desired, the microphones could be permitted by the microprocessor to be utilized simultaneously at varying output levels.

To further enhance the microprocessor, a sensor 56 can be connected to each of the summing bus lines 50 and 52 and in turn interconnected to microprocessor 46. Sensors 56 are utilized to monitor the summed output from voltage control amplifiers 16 and 16' and through the microprocessor appropriately activate the voltage control amplifier 16, 16'. In this manner, the signal output through connectors 22, 28, 30 and 32 can be selectively and appropriately varied depending upon the environmental conditions at the audio output, such as the speaker locations. For example, and using again, the conference room example, if the size of the room has been expanded to accommodate a larger crowd, or if the background noise level of the crowd increases due to the size of the crowd, pre-loaded instructions into the microprocessor 46 can cause the volume output level to be appropriately varied in order to accommodate environmental conditions within the conference room.

Through the utilization of sensors 54 and 56, microprocessor 10 when down-loaded with appropriate instructions, can provide a controlled and disciplined format for a plurality of audio inputs by which the system can be simply and specifically user-managed.

It is to be understood the invention is not to be limited to the details above given, but may be modified within the scope of the appended claims.

What I claim is:

1. An audio multiplexer comprising multiple input means each for receiving an audio signal, a separate control means associated with each input means for selectively varying the volume of said audio signal received from said associated input means upon activation of the control means, computer means connected to each control means for selectively activating each control means, output means in summed association with each control means for receiving said audio signal from the controls means, and a sensing means located between each input means and control means for monitoring said audio signal into the control means, said computer means associated with each sensing means for monitoring said audio signal into each control means and causing said control means to be selectively activated to regulate the audio signal received by said associated input means.

2. The audio multiplexer of claim 1 wherein said computer means is a microprocessor.

3. The audio multiplexer of claim 1 and other sensing means located between with each control means and output means for monitoring said audio signal from the control means, said computer means associated with each other sensing means for monitoring said audio signal from each control means and causing the control means to be selectively activated to regulate the audio signal received by said output means.

4. The audio multiplexer of claim 3 and including means associated with each input means and associated control means for amplifying said audio signal into the control means, each first mentioned sensing means for receiving said amplified signal from said amplifying means.

5. The audio multiplexer of claim 4 and including other amplifying means associated with each output means for receiving said summed audio signal from each control means to balance said summed audio signal at said output means.

6. The audio amplifier of claim 5 wherein each control means includes a pair of voltage control amplifiers, each voltage control amplifier for receiving a portion of said audio signal from said first mentioned associated amplifier means.

7. The audio amplifier of claim 6 wherein one of said voltage control amplifiers of each control means having an output, said outputs of each one voltage control amplifiers being summed, said other of said voltage control amplifiers of each of said control means having an output, said outputs of other voltage control amplifiers being summed.

* * * * *